(12) United States Patent
Kushmaul et al.

(10) Patent No.: US 6,624,376 B1
(45) Date of Patent: Sep. 23, 2003

(54) WIRE GUIDE FOR ELECTRIC DISCHARGE MACHINE

(75) Inventors: William E. Kushmaul, Paradise Valley, AZ (US); Paul J. Moosbrugger, Scottsdale, AZ (US); John P. Teenstra, Chandler, AZ (US)

(73) Assignee: Tech Mold, Inc., Tempe, AZ (US)

( * ) Notice: Subject to any disclaimer, the term of this patent is extended or adjusted under 35 U.S.C. 154(b) by 0 days.

(21) Appl. No.: 10/153,248

(22) Filed: May 21, 2002

(51) Int. Cl.[7] ................................................. B23H 7/10
(52) U.S. Cl. ..................................................... 219/69.12
(58) Field of Search ....................................... 219/69.12

(56) References Cited

U.S. PATENT DOCUMENTS

| | | | |
|---|---|---|---|
| 4,605,834 A | * | 8/1986 | Inoue ....................... 219/69.12 |
| 4,611,107 A | * | 9/1986 | Inoue ....................... 219/69.12 |
| 4,686,344 A | | 8/1987 | Nakayama |
| 4,791,264 A | | 12/1988 | Walser |
| 4,833,291 A | | 5/1989 | Aso |
| 4,896,012 A | | 1/1990 | Barbulescu |
| 5,086,202 A | | 2/1992 | Iwasaki |
| 5,214,260 A | | 5/1993 | Fricke |
| 5,585,013 A | * | 12/1996 | Truty ....................... 219/69.12 |
| 5,958,260 A | | 9/1999 | Shih |

FOREIGN PATENT DOCUMENTS

DE    4430808 A1  *  3/1996

* cited by examiner

Primary Examiner—Geoffrey S. Evans
(74) Attorney, Agent, or Firm—LaValle D. Ptak (57) ABSTRACT

A wire guide for an electric discharge machine is designed with three elongated, cylindrical ceramic rods which close around the electrode wire to maintain its center orientation. The ceramic rods are removably held in pivotal clamps for replacement when they become worn. The clamps are interlinked to move toward and away from one another, with an infinite range of adjustment; and once the rods are positioned to clamp the wire electrode, the jaws are locked in position during the operation of the electric discharge machine.

26 Claims, 7 Drawing Sheets

WIRE GUIDE FOR ELECTRIC DISCHARGE MACHINE

BACKGROUND

Electric discharge machines (EDM) are commonly used for making precise cuts, holes and otherwise shaping electrically conductive materials, such as steel, copper and the like. EDM machines employ a thin, consumable hollow wire, typically made of copper, using the spark discharge of the wire (internally cooled with water flow through it) to effect the EDM machining of various parts. In order to guide the wire, it is necessary to provide a device to center it and to hold the wire as it revolves and is moved downwardly through the EDM apparatus.

When EDM apparatus is used to bore holes or other shapes through a work piece, the hollow wire electrode is fed through the guide onto the work piece, where electro-erosion between the wire and the work piece forms a bore or hole through the work piece. This hole is a precise image of the wire electrode. In this type of machine, the wire electrode continuously is consumed during the cutting process; so that it continuously must be replenished by feeding it through the centering guide.

When an EDM apparatus is used to cut through a work piece in a precise pattern, a hollow wire electrode is unwound from a supply spool and is wound back around a return spool, with the spools both rotating to provide a precise constant rate of movement of the wire between them. Again, a centering wire guide is utilized between the two spools to accurately locate the moving wire electrode with respect to the workpiece. This causes the EDM discharge, which occurs between the wire and the work piece, to be accurately located with respect to the work piece which is moved under the control of a computer operated system to effect the desired cut through the work piece. In this type of system, the wire electrode is only partially consumed; but it still must be continually replenished as the exterior surface of the electrode is depleted through the discharge operation.

It has been common to use an orifice or circular collar wire guide of fixed diameter to guide the moving wire electrode in an EDM apparatus. Typically, the orifice or collar is manufactured to be slightly larger than the external diameter of the wire electrode. The United State patents to Iwasaki U.S. Pat. No. 5,086,202 and Fricke U.S. Pat. No. 5,214,260 both disclose fixed diameter wire guide in the form of circular collars. Apart from the absolute precision with which the orifices or circular openings in such fixed diameter wire guides must be manufactured, the guides also must be replaced when they become even slightly worn. In addition, if an EDM apparatus is changed over from the use of a machining wire of one diameter to a wire of another diameter, it is necessary to replace the wire guide in order to accommodate the different diameter wire electrode. Each time a new diameter is required, or replacement of an existing orifice because of wear is required, it is necessary to shut down the EDM apparatus while the changeover or replacement takes place. Such "down time" is non-productive, and results in increased overall cost of EDM machining, which is not desirable.

The United States patent to Shin U.S. Pat. No. 5,958,260 is directed to a three point guide for centering the wire electrode of an EDM machine. This patent, however, discloses a system which requires fixed rod diameters selected for each different wire diameter to be used by the guide. As a consequence, the changeover requirements which are mentioned above, with respect to the Iwasaki and Fricke patents, also apply to the Shih patent apparatus requiring precision rod diameters and necessary down time for effecting replacement and changeover of the guide wire rods themselves.

Attempts to provide a more universal centering of the wire electrode of an EDM machine have included three point supports, or multi-point supports which are spring biased to hold the guides against the wire electrodes. The Unitde States patent to Nakayama U.S. Pat. No. 4,686,344 employs three balls or three rings which are biased by springs or fluid cylinders to engage the wire electrode, and thereby center it between the balls or rings during the feeding of the wire in the EDM machining operation. The use of spring force, however, as disclosed in the Nakayama patent, is not entirely reliable for accurate centering because the springs themselves may exhibit different amounts of force, which would then allow the wire electrode to deviate from its desired path.

Another spring operated centering device is disclosed in the Unitde States patent to Walser U.S. Pat. No. 4,791,264. This patent uses a wire guide with a pair of L-shaped legs, which are biased by means of a centering spring around the electrode wire, to provide the desired tension and centering of the wire. Once again, this is a spring biasing mechanism, subject to the inherent disadvantages of such mechanisms, which reduces its reliability for precision machining operations.

Two other United State patents Truty U.S. Pat. No. 5,585,013 and Aso U.S. Pat. No. 4,833,291, and are directed to wire guides providing a three point support. The device of Truty uses three or more spherical-balls which are biased against the wire by means of gravity as the balls rest on the walls of a generally tapered bore. There is little disclosure in the patent as to how the device disclosed in Truty actually works, although it appears that a spring bias is used to press the balls downwardly against the tapered surface, and therefore, toward the center against the wire electrode of the EDM apparatus.

In the device of the Aso patent, a three point support also is provided. A triangular groove is provided in one guide; and a flat surface is provided in another, to press against the wire, providing a three point support as the wire moves through the guide. The device of Aso relies upon spring tension to press the guide members toward one another against the sire passing through the guide.

Accordingly, it is desirable to provide an accurate, easily adjustable EDM machine wire guide which overcomes the disadvantages of the prior art mentioned above, which is easy to use, easy to adjust, and easy to maintain while providing precision accuracy in the apparatus in which is it used.

SUMMARY OF THE INVENTION

In accordance with a preferred embodiment of the invention, a support guide for a wire electrode in an electric discharge machine includes a main housing. This housing has spaced apart upper and lower portions, in the form of parallel plates with aligned openings through them, through which the wire electrode passes. Three alignment jaws each are pivotally mounted to the housing in the space between the upper and lower plates for rotation toward and away from one another, and from a central axis passing through the jaws and the openings in the upper and lower plates. A linking mechanism is pivotally attached to the jaws to move them simultaneously toward and away from the central axis by substantially identical amounts.

In a more specific embodiment of the invention, the alignment jaws include clamps each of which hold an elongated cylindrical ceramic rod, with the ceramic rods contacting the wire electrode during operation of the centering device.

DETAILED DESCRIPTION

Figures 1, 2, 3, 4:
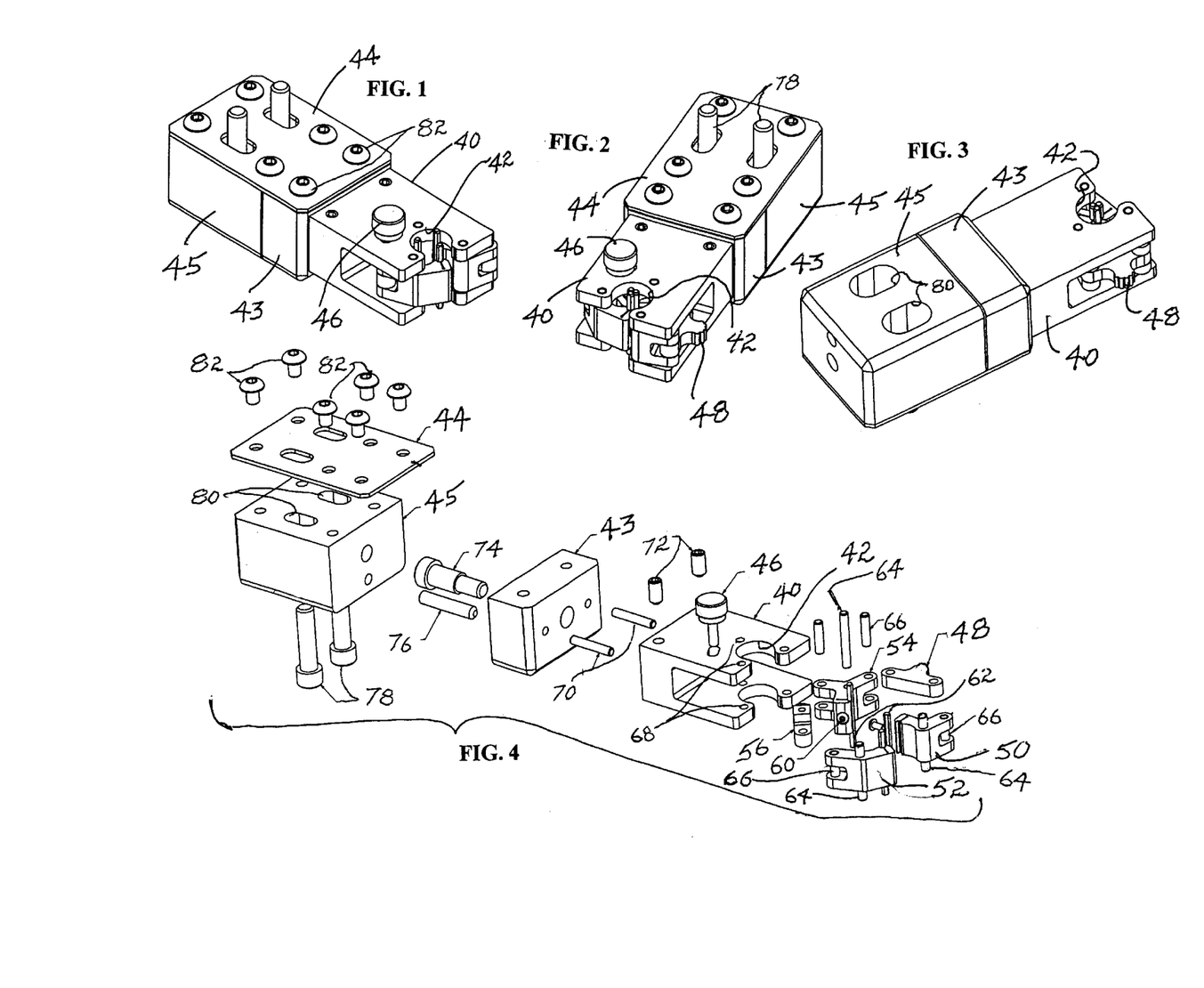
FIG. 1 is a top, left, front perspective view of a preferred embodiment of the invention.
FIG. 2 is a top, right, perspective view of the embodiment shown in FIG. 1.
FIG. 3 is a bottom, right, perspective view of the embodiment shown in FIGS. 1 and 2.
FIG. 4 is an exploded view of the embodiment shown in FIGS. 1, 2 and 3.

Reference now should be made to drawings, in which the same reference numbers are used throughout the different figures to designate the same or similar components. FIGS. 1, 2 and 3 each are perspective views from the top left front, top left right, and bottom right of a preferred embodiment of the invention. These figures depict a support guide for a hollow wire electrode (or similar element) as used in an electric discharge machine, or the like. No details of the wire feeding mechanism, wire take up mechanism (if any), or of other parts of the EDM machine are shown, since all of these parts are standard; and the wire guide which is described and shown in the various figures may be used with any standard EDM machine. FIG. 4 is an exploded view of the apparatus shown in FIGS. 1, 2 and 3; and reference to all of the figures may be made for an understanding of how the various parts fit together and are assembled.

The wire guide support includes a basic block 45, which may be attached to the frame of the EDM machine with which the preferred embodiment of the invention is to be used. This attachment is by means of fasteners 78 which pass upwardly through the block 45, through adjustment slots 80, and upward through a spring steel plate 44 having similar slots aligned with the slots 80. The plate 44 is attached to the top of the block 45 by means of threaded fasteners 82, as most clearly illustrated in FIGS. 1 and 4.

As can be seen from an examination of all of FIGS. 1, 2 and 3, the plate 44 extends to the right (as viewed in FIGS. 1 and 4). An adjustable mounting block 43 is located intermediate the block 45 and a housing 40 for the wire guide assembly. The block 43 is attached to the block 45 through a central fastener 74 to allow a limited amount of relative rotation about the fastener 74. A set screw 76 then is used to secure the block 43 in the rotated position once the adjustment in the rotational direction of the block 43 with respect to the block 45 has been effected. Further adjustment in a side-to-side manner of the block 43, relative to the housing 40, is effected by a pair of adjusting rods 70, the location of which is shown most clearly in FIGS. 4, 6 and 8. The adjusting rods 70 interface between the front (right-hand end as viewed in FIG. 4) face of the block 43 and the rear (left-hand as viewed in FIG. 4) of the wire guide assembly housing 40. Once the adjustment has been effected, a pair of set screws 72 engage the rods 70 to secure the relative left to right tilt of the housing 40, with respect to the block 43 for the desired adjustment.

Figure 30:
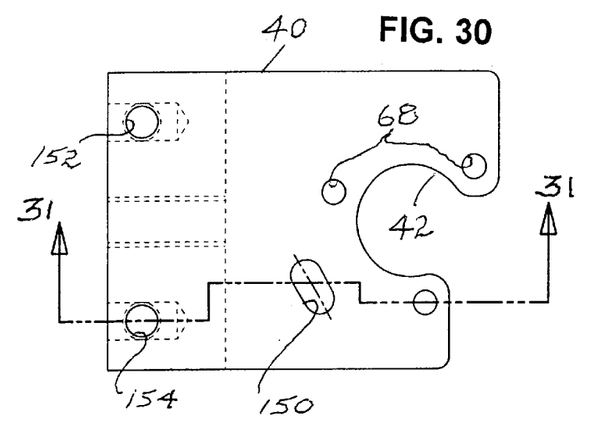
FIG. 30 is a top view of the housing used in the preferred embodiment shown in FIGS. 1 through 4.
Figure 31:
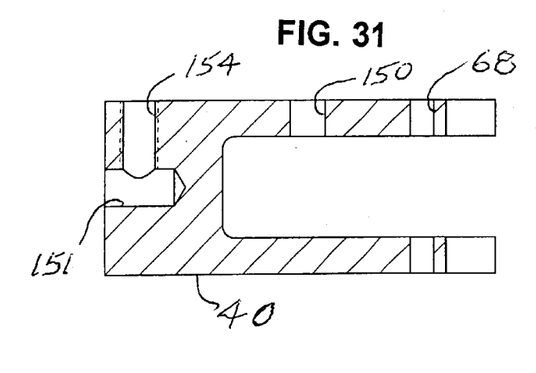
FIG. 31 is a cross-sectional view taken along the line 31—31 of FIG. 30.
Figure 32:
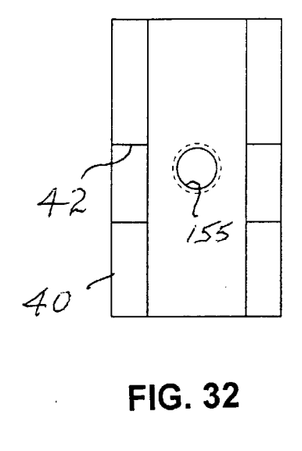
FIG. 32 is an end view of the housing shown in FIG. 30.
Figure 33:
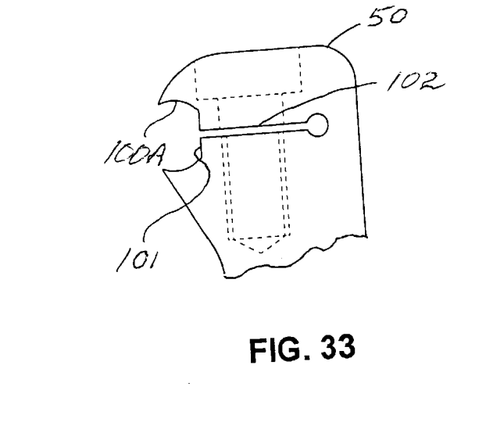
FIG. 33 is an enlarged view of an alternative jaw used in conjunction with the ceramic rod shown in FIGS. 14, 17 and 18.

FIGS. 30 and 32 illustrate in greater detail the manner in which this is done. The adjusting rods 70 enter into recesses 151 in the housing 40 and the set screws 72 are threaded through appropriate passages 152 and 154 to engage the rods 70. The respective location of the rods 70 in the passageways in the block 43 and in the passageways 151 (FIG. 31) of the housing 40 for the wire guide assembly is illustrated most clearly in FIGS. 6 and 8.

As is most apparent from FIGS. 4, 5, 7, 30, 31 and 32, the support guide assembly is placed in the housing 40. The right-hand end of the housing 40 (as viewed in FIGS. 1, 4, 5, 7, and 31) is hollowed out to form a U-shaped cross section, with an upper plate spaced from a lower plate in parallel planes. A generally circular cut-out 42 is formed through both of these plates; and the central axis of this generally circular cut-out is perpendicular to the planes of the upper and lower plates formed in the open end of the housing 40.

Figures 11, 12:
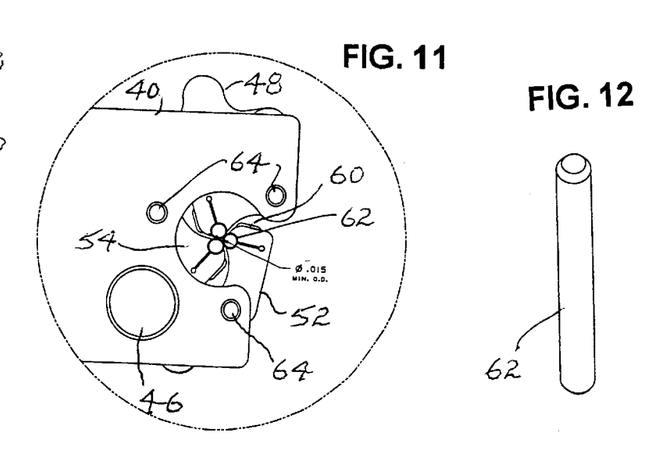
FIG. 11 is an enlarged view of the portion circled as 11 in FIG. 10 to illustrate details of that portion.
FIG. 12 is perspective view of a ceramic rod used in the embodiment of the invention illustrated in FIGS. 9, 10 and 11.
Figure 19:
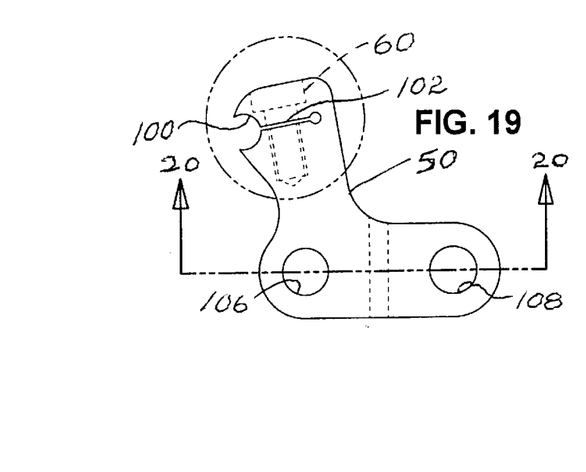
FIG. 19 is a detail of one of the clamping jaws of a preferred embodiment of the invention.
Figure 22:
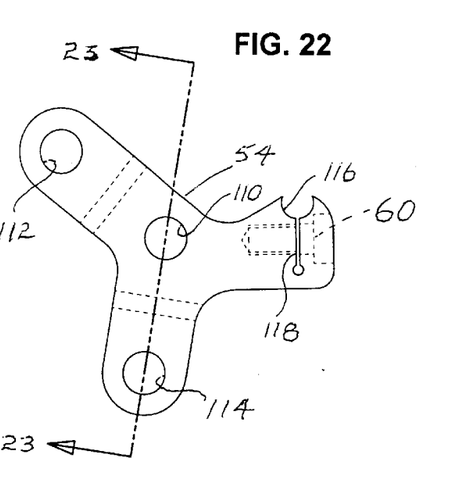
FIG. 22 is a top view of another one of the clamping jaws of the preferred embodiment of the invention.
Figure 24:
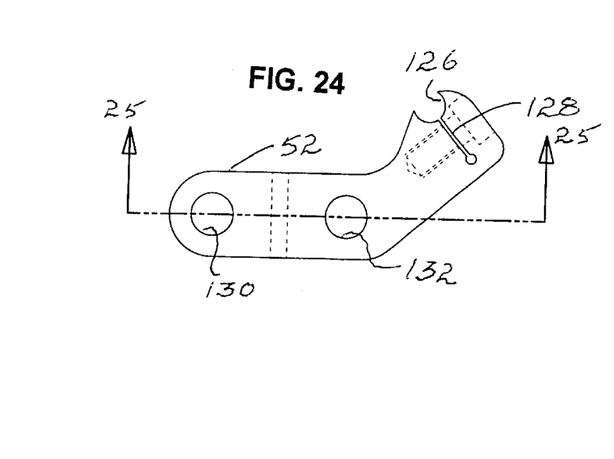
FIG. 24 is a top view of a third clamping jaw used in a preferred embodiment of the invention.

Three sets of aligned holes 68 are equally angularly spaced around the circular opening 42, through both the upper and lower plates of the block 40, as illustrated most clearly in FIGS. 4, 11 and 30. These holes 68 support pivot shafts 64, which extend through both plates and, through the opening between them, to pivotally secure each of three different alignment jaws 50, 52 and 54. One pivot shaft 64 passes through the pivot opening 106 in the jaw 50 (FIG. 19). The pivot shaft 64 for the jaw 52 passes through the opening 132 (FIG. 24); and the pivot shaft 64 for the generally Y-shaped jaw 54 passes through the opening 110 (FIG. 22). Thus, each of the three jaws, 50, 52 and 54 are free to achieve rotational pivotal movement about the corresponding pivot shafts 64 passing through them.

The remainder of the positioning mechanism for the jaws 50, 52 and 54 is provided by a pair of elongated links 48 and 56, shown in the exploded view of FIG. 4 and shown in detail in FIGS. 26 through 29. The link 48 has a thumb engagement projection at its midpoint extending beyond the edge of the main housing 40, as illustrated in various ones of the figures, such as 2, 3, 6, 8, 9 and 10. This link 48 has a pair of pivot pin receiving apertures 140 and 142 in it, which align, respectively, with the apertures 108 in the alignment jaw 50 (FIG. 19) and the aperture 112 in the alignment jaw 54 (FIG. 22). Pivot pins 66 interconnect these apertures. Similarly, the pivot linkage 56 is pivotally engaged by pivot pins 66 through its aperture 144 to the aperture 114 of the jaw 54 (FIG. 22) and through its aperture 146 (FIG. 29) to the aperture 130 (FIG. 24) of the alignment jaw 52. The interrelationships of all of these various linkages and the relative movement which is effected through them is shown most clearly in FIGS. 4, 6 and 8.

The final element of structure for holding the alignment jaws in place once an adjustment has been made, is effected through a thumbscrew 46 passing through a slot 150 in the top of the wire guide assembly housing 40, as shown most clearly in FIGS. 4, 30 and 31. This thumbscrew 46 threads into a central threaded aperture 148 in a raised hub 156 on the pivot 56 to hold everything tightly against further rotation once the thumbscrew 46 is engaged to pull the top surface of the hub 156 into engagement with the bottom surface of the upper plate of the cavity in which these elements are placed. When this is done, no further rotation of any of the parts takes place. When the thumbscrew 46 is released to allow pivotal movement of all of the various parts, as described above, the jaws 50, 52 and 54 are allowed limited relative pivotal movement toward and away from the central axis through the circular opening of the wire guide assembly housing, as described above.

Figure 15:
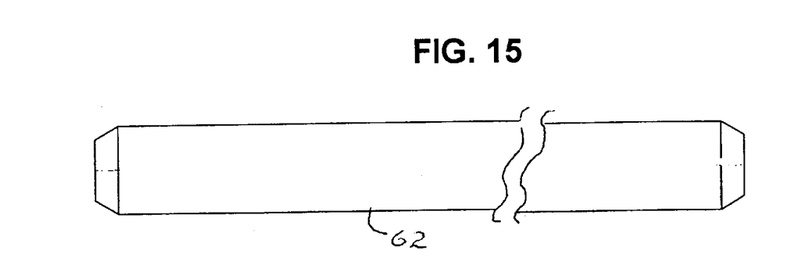
FIG. 15 is a side view of a ceramic rod of the type shown in FIG. 12.
Figure 16:
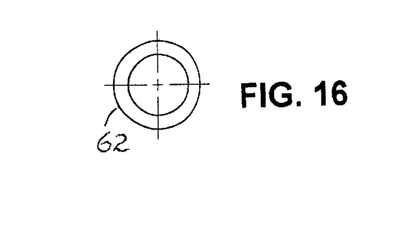
FIG. 16 is an end view of the rod shown in FIG. 15.

The actual contact members for engaging the wire electrode of an electric discharge machine comprise short segments of solid cylindrical ceramic rods 62, shown most clearly in FIGS. 12, 15 and 16. The ceramic rods typically have a length of one-half inch to ⅞ inches, or greater. The rods 62 may extend all of the way to the part undergoing machining, if desired. These rods 62 are greater in length than the clamping ends of the adjustment jaws 50, 52 and 56, as is readily apparent from an examination of FIGS. 1, 5 and 7. The rods 62 typically carry a hardness of 88 to 90 Rockwell, or Coors AD 998. The other elements of the structure which has been described above typically are made of stainless steel. The ceramic rods 62 are non-conductive; so that they may be in contact with the wire electrode of the EDM machine during its operation. The typical external diameter of the rod 62 is 0.093 inches for use with wire electrodes having a range of external diameters of 0.006 inches to 2.50 inches. These dimensions are typical for a general range of applications; but, obviously, the various dimensions of the different parts can be adjusted in accordance with any particular specific situation requiring different dimensions.

Figure 20:
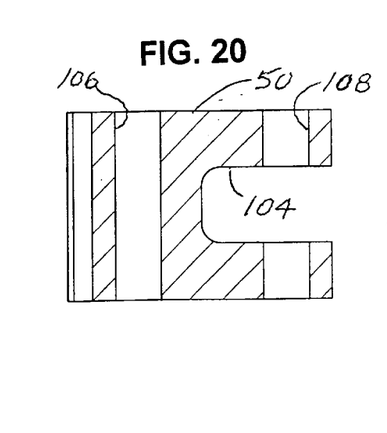
FIG. 20 is a cross-sectional view taken along the line 20—20 of FIG. 19.
Figure 21:
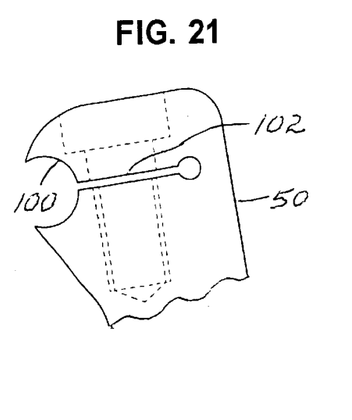
FIG. 21 is an enlarged view of a portion of the embodiment circled in FIG. 19.
Figure 23:
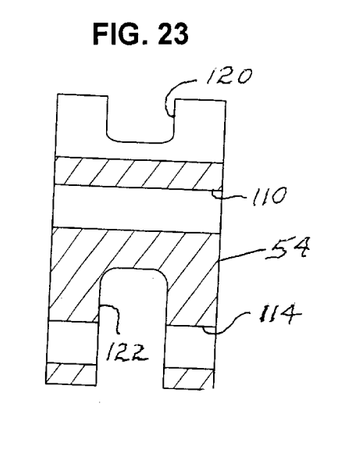
FIG. 23 is a cross—sectional view taken along the line 23—23 of FIG. 22.
Figure 25:
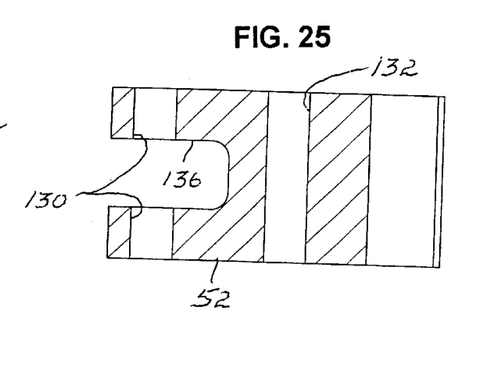
FIG. 25 is a cross-sectional view taken along the line 25—25 of FIG. 24.
Figure 26:
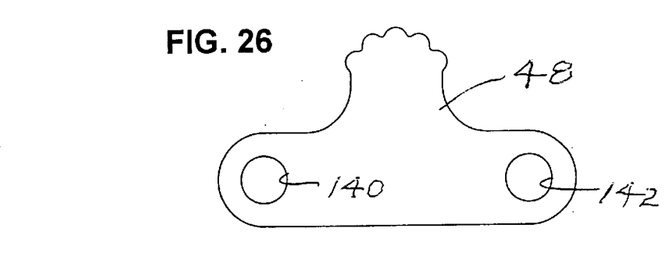
FIG. 26 is a top view of a linking lever of the preferred embodiment of the invention.
Figures 27, 28:
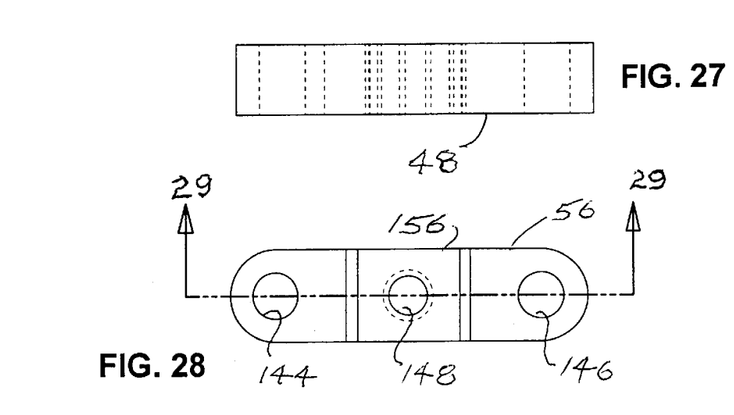
FIG. 27 is a side view of the lever shown in FIG. 26.
FIG. 28 is a top view of another linking lever used in the preferred embodiment of the invention.
Figure 29:
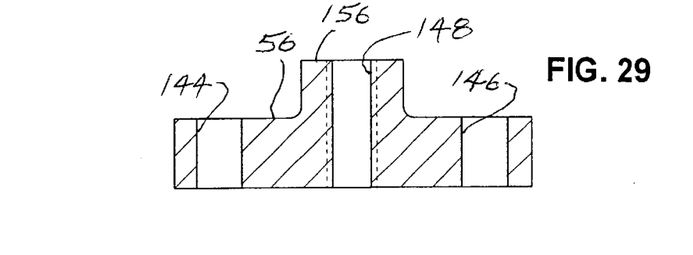
FIG. 29 is a cross-sectional view taken along the line 29—29 of FIG. 28.

The ceramic guide rods 62 are held in place by means of C-shaped clamp members on the ends of each of the alignment jaws 50, 52 and 54. FIG. 19 shows the clamp 100 on the jaws 50. This clamp has an internal diameter slightly greater than the external diameter of the rod 62. The clamp 100 extends slightly past a diameter of the rod 62 to hold the rod 62 in place when a set screw 60 is tightened to squeeze the jaw 100 about the external surface of all or a portion of the rod 62 by a squeezing action of the slot 102 shown in the lever 50. This is shown most clearly in FIGS. 19, 20 and 21 for the jaw 50. Similar clamping or holding of the rods 62 in the levers 52 and 54 is effected by means of the jaws 116 in the lever 54 and 126 in the lever 52, via movement of the slots 118 for the lever 54 and 128 for the lever 52 through tightening or releasing of an adjustment screw 60 in each of these jaws. These features are illustrated in FIGS. 22 and 23 for the jaw 54, and in FIGS. 24 and 25 for the jaw 52.

As is readily apparent from an examination of FIGS. 19 through 25, rapid and effective changing of a worn ceramic guide rod 62 and replacement with a new guide rod 62, may be implemented without dismantling the support wire guide assembly. This is apparent from an examination of FIGS. 5,6,9 and 10, for example, which illustrate the openness and accessibility of the set screws 60 for effecting such a change.

Figure 5:
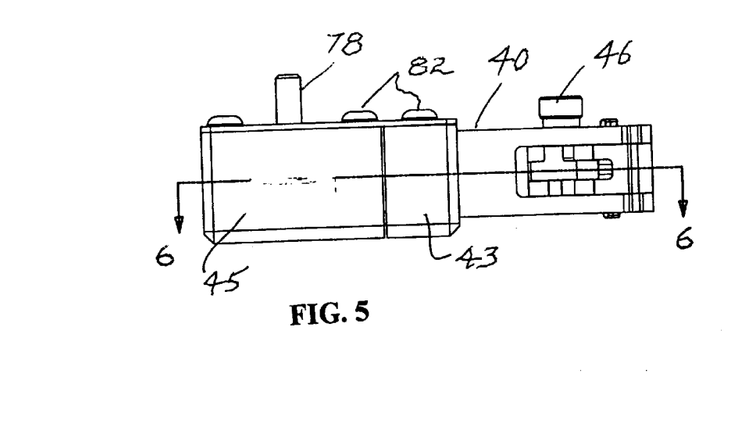
FIG. 5 is a side view of the embodiment shown in FIGS. 1 to 3 in a first position of operation.
Figure 6:
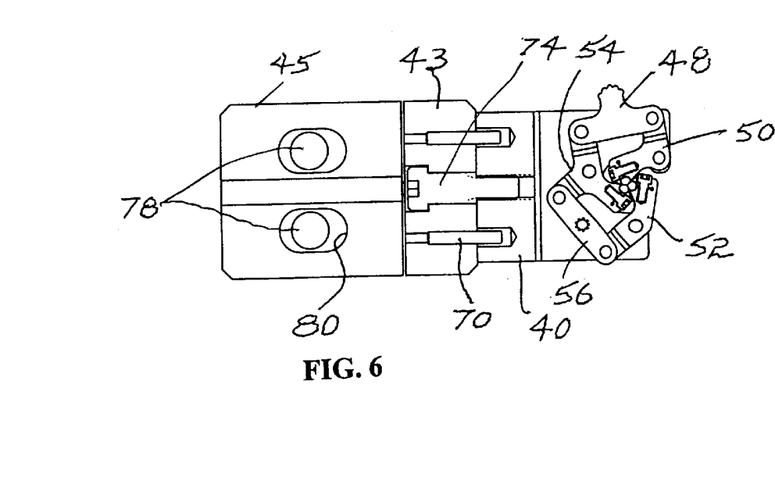
FIG. 6 is a sectional taken along the line 6—6 of FIG. 5.
Figure 7:
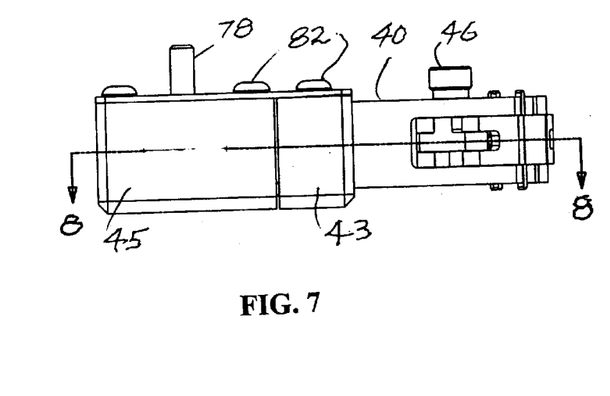
FIG. 7 is a side view of the embodiment of FIGS. 1 to 3 in a second state of operation.

Adjustment of the alignment jaws 50,52,54 to place the three ceramic rods 62 into contact with a wire electrode passing vertically through them, along. the central axis of the circular opening 42, is effected by moving the thumb lever extension on the lever 48 back and forth from left to right, as viewed in FIGS. 4, 6, 8, 9 and 10. FIGS. 5 and 6 illustrate the adjustment of the device to place the rods 62 in contact with one another, thereby forming the smallest aperture through which a wire electrode may pass. This is effected by pushing the extension on the lever 48 toward the left, as viewed in FIGS. 4 and 6. This causes all of the alignment jaws 50, 52 and 54 to rotate about their pivots 64 in a counterclockwise direction, causing the jaws to come together as viewed in FIG. 6.

Figure 8:
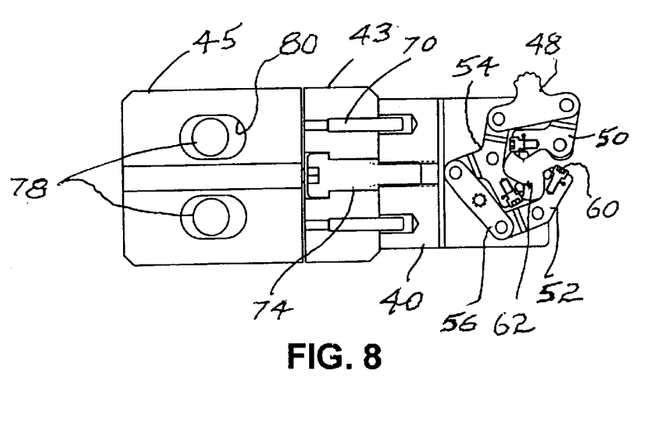
FIG. 8 is a sectional view taken along the line 8—8 of FIG. 7.
Figure 9:
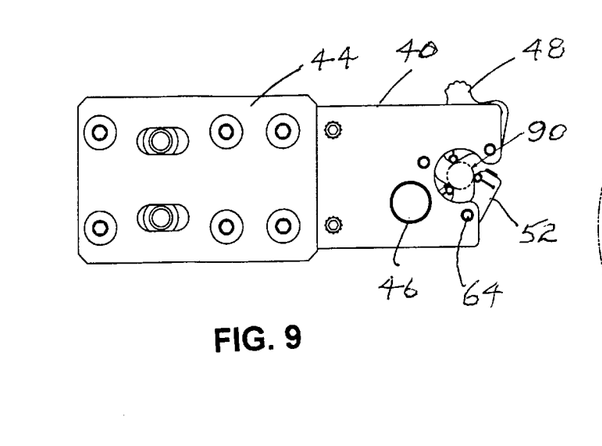
FIG. 9 is a top view of the embodiment of FIGS. 1 through 3 showing the positioning of the mechanism for centering a wire electrode.

When the thumb extension on the lever arm 48 is pushed or pulled to the right, as viewed in FIGS. 4, 6, 8 and 9, the jaws 50, 52 and 54 are caused to pivot clockwise about the pivot pins 64 to open the jaws,.as shown in FIG. 8. FIG. 9 shows the jaws at a position which is intermediate that of FIGS. 6 and 8. In FIG. 9, the jaws 50,52 and 54 are in contact with a wire electrode 90, shown in dotted lines in FIG. 9.

It should be noted that the adjustability of the jaws 50, 52, 54 from the smallest opening shown in FIG. 6 to the largest one shown in FIG. 8 is infinite. To effect centering on a wire electrode or on a solid gauge pin for establishing an initial adjustment, the wire or pin is placed in the opening between all of the rods with the device in its wide open position, such as shown in FIG. 8. The thumb extension on the lever 48 then is moved to the left, as viewed in FIGS. 4 and 6, until the wire or gauge pin is engaged as shown in FIG. 9. The pressure to which this adjustment is made is selected to be tight enough to prevent the gauge pin or actual wire electrode from falling out. Once the adjustment has been made, the thumbscrew 46 is tightened as described previously. The adjustment then is held and maintained throughout operation of the device, until such time as a readjustment or a different sized wire electrode is to be used. The open end of the housing 42 permits a wire or gauge pin to be moved through the open end, past the alignment jaws 50 and 52 in the opening, which is most apparent from an examination of FIG. 8. Typically, however, the gauge pin or the actual EDM wire is passed vertically downwardly through the device in the opening, prior to engagement of the rods 62 with the EDM wire. It should be noted that the longitudinal axes through the rods 62 are all parallel with one another and parallel with the vertical central axis passing through the circular openings 42 in the upper and lower plates of the housing 40.

Figure 10:
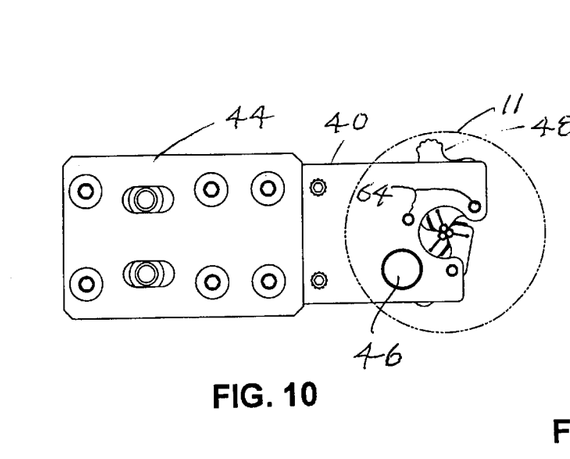
FIG. 10 is a top view of the embodiment shown in FIG. 9 in a different position of operation.
Figure 13:
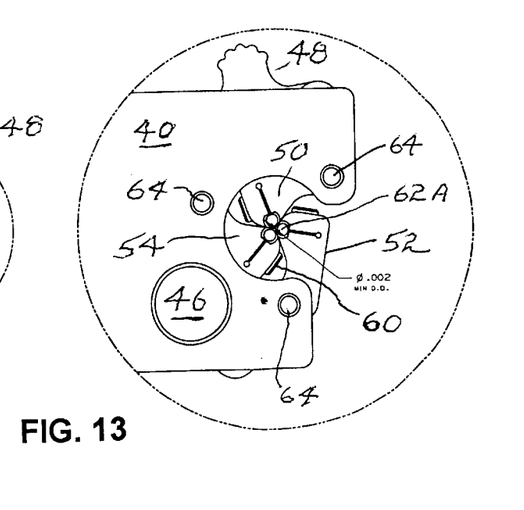
FIG. 13 is an enlarged view similar to that of FIG. 11 showing an alternative embodiment.
Figure 14:
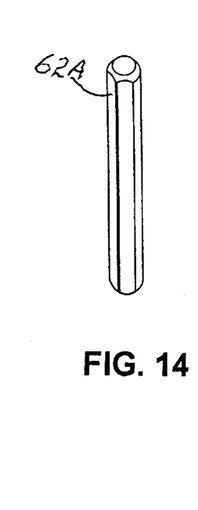
FIG. 14 is a perspective view of a ceramic rod of the type used in the alternative embodiment of FIG. 13.
Figure 17:
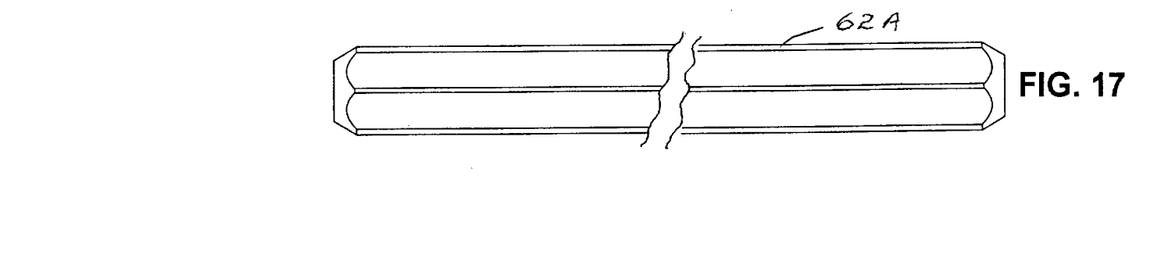
FIG. 17 is a side view of the ceramic rod shown in FIG. 14.
Figure 18:
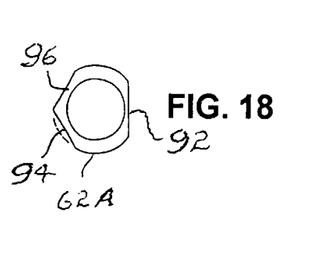
FIG. 18 is an end view of the rod shown in FIG. 17.

For EDM wires having very small external diameters, a different configuration of a ceramic rod is used. This configuration is shown in FIGS. 14, 17 and 18. In all other respects, the apparatus works in the same manner as described above in conjunction with the use of the ceramic guide rods 62. The rods 62A of FIGS. 14, 17 and 18, however. have an elongated flat surface 92 diametrically opposite an elongated point formed by two other flats 94 and 96, as shown most clearly in FIG. 18. The clamps on the ends of the jaws are then modified, in the manner surface 101 adjacent the slot 102 to be engaged by the flat surface 92 extending the length of the rod 62A. When the rods 62A are clamped in position in all three of the clamping jaws 50, 52 and 54, the relative points between the surfaces 94 and 96 allow for much smaller diameter wire electrodes to be engaged by the device. The modifications which are shown for doing this are illustrated in FIGS. 10 and 13, with the enlarged view of FIG. 13 showing the manner in which the elongated ridge between the surfaces 94 and 96 interacts with similar ridges on the other rods 62A in the various jaws 50, 52 and 54 to allow very small diameter wire to be held and guided by the wire guide support assembly. The manner of operation of the assembly, however, is identical, whether cylindrical rods 62 are used or the modified shapes of the rods 62A are employed.

The foregoing description of the preferred embodiment of the invention is to be considered as illustrative and not as limiting. Various changes and modifications will occur to those skilled in the art for performing substantially the same function, in substantially the same way, to achieve substantially the same result, without departing from the true scope of the invention as defined in the appended claims.

What is claimed is:

1. A support guide for a wire electrode in an electric discharge machine, the support guide including in combination:

a housing having spaced apart upper and lower portions with aligned openings therethrough;

three alignment jaws each pivotally mounted to the housing in the space between the upper and lower portions for rotation toward and away from one another, and toward and away from a central axis passing through the jaws and the openings in the upper and lower portions of the housing; and a linking mechanism pivotally attached to the three alignment jaws to simultaneously move the jaws toward and away from two the central axis by substantially identical amounts.

2. The support guide according to claim 1 further including a locking member for releasably securing the three alignment jaws in a fixed position relative to one another and relative to the central axis.

3. A support guide according to claim 2 further including a thumb tab on either the linking mechanism or one of the alignment jaws for pivoting the jaws toward and away from one another.

4. The support guide according to claim 3 wherein the housing comprises a unitary block having a U-shaped cross section forming the spaced-apart upper and lower portions.

5. The support guide according to claim 4 wherein each of the three alignment jaws is designed to removably hold an elongated ceramic rod segment having a longitudinal axis therethrough parallel to the central axis passing through the opening in the upper and lower portions of the housing, such that movement of the alignment jaws toward one another presents the elongated ceramic segments in a position to grip a wire electrode passing therebetween on the central axis through the opening in the upper and lower portions of the housing.

6. The support guide according to claim 5 wherein the openings through the upper and lower portions of the housing are substantially circular, with the central axis passing through the center of the circular openings.

7. The support guide according to claim 1 wherein the upper and lower portions comprise upper and lower plates in parallel planes and the central axis is perpendicular to the planes of the upper and lower plates.

8. The support guide according to claim 1 wherein each of the three alignment jaws is designed to removably hold an elongated ceramic rod segment having a longitudinal axis therethrough parallel to the central axis passing through the opening in the upper and lower portions of the housing, such that movement of the alignment jaws toward one another presents the elongated ceramic segments in a position to grip a wire electrode passing therebetween on the central axis through the opening in the upper and lower portions of the housing.

9. A support guide according to claim 8 further including a thumb tab on either the linking mechanism or one of the alignment jaws for pivoting the jaws toward and away from one another.

10. The support guide according to claim 9 further including a locking member for releasably securing the three alignment jaws in a fixed position relative to one another and relative to the central axis.

11. The support guide according to claim 1 wherein the upper and lower portions comprise upper and lower plates in parallel planes and the central axis is perpendicular to the planes of the upper and lower plates.

12. The support guide according to claim 11 wherein the housing comprises a unitary block having a U-shaped cross section forming the spaced-apart upper and lower portions.

13. The support guide according to claim 12 wherein the openings through the upper and lower portions of the housing are substantially circular, with the central axis passing through the center of the circular openings.

14. The support guide according to claim 13 wherein each of the three alignment jaws is designed to removably hold an elongated ceramic rod segment having a longitudinal axis therethrough parallel to the central axis passing through the opening in the upper and lower portions of the housing, such that movement of the alignment jaws toward one another presents the elongated ceramic segments in a position to grip a wire electrode passing therebetween on the central axis through the opening in the upper and lower portions of the housing.

15. A support guide according to claim 1 further including a thumb tab on either the linking mechanism or one of the alignment jaws for pivoting the jaws toward and away from one another.

16. The support guide according to claim 1 wherein the housing comprises a unitary block having a U-shaped cross section forming the spaced-apart upper and lower portions.

17. In a three point support guide for a wire electrode in an electric discharge machine having a housing for the support guide, an improvement including:

three elongated cylindrical ceramic guide rods spaced to engage and guide a wire electrode of an electric discharge machine, with at least one of the elongated ceramic rods being movable toward and away from the others of the elongated ceramic rods; and three clamping members for clamping different corresponding ones of the three elongated ceramic rods to hold the rods in alignment parallel to one another, the clamping members each including means for removably holding the elongated ceramic rods during operation of the support guide and permitting replacement of the ceramic rods when the rods become worn.

18. The support guide according to claim 17 wherein the clamping members each comprise a C-clamp for removably holding the ceramic rods.

19. The support guide according to claim 18 further including a member for releasably locking the clamping members into different relative spaced positions with respect to one another.

20. The support guide according to claim 19 wherein each of the three clamping members are pivotally mounted in the housing for movement toward and away from one another.

21. The support guide according to claim 20 further including a linking mechanism interconnecting the three clamping members for simultaneous movement toward and away from one another for adjusting the space between the ceramic rods.

22. The support guide according to claim 17 wherein each of the three clamping members are pivotally mounted in the housing for movement toward and away from one another.

23. The support guide according to claim 22 further including a linking mechanism interconnecting the three clamping members for simultaneous movement toward and away from one another for adjusting the space between the ceramic rods.

24. The support guide according to claim 23 wherein the clamping members each comprise a C-clamp for removably holding the ceramic rods.

25. The support guide according to claim 17 further including a member for releasably locking the clamping members into different relative spaced positions with respect to one another.

26. The support guide according to claim 17 further including a linking mechanism interconnecting the three clamping members for simultaneous movement toward and away from one another for adjusting the space between the ceramic rods.

* * * * *